United States Patent Office 3,749,693
Patented July 31, 1973

3,749,693
PROCESS FOR THE PREPARATION OF POLY-PHENYLENE ETHERS AND COMPOSITIONS CONTAINING THE SAME
Glenn D. Cooper, Delmar, N.Y., assignor to General Electric Company
No Drawing. Filed Nov. 5, 1971, Ser. No. 196,195
Int. Cl. C07c *47/20;* C08g *23/18*
U.S. Cl. 260—47 ET          7 Claims

ABSTRACT OF THE DISCLOSURE

A process for the preparation of 2,6-disubstituted-1,4-phenylene ether dimers, oligomers and polymers, such as those of the formula:

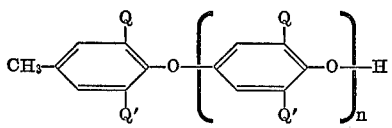

wherein Q and Q' are selected from the group consisting of lower aliphatic radicals having from 1–4 carbon atoms and phenyl; and $n$ is a whole integer of from 1 to about 300, which comprises polymerizing a suitable monomer in the presence of oxygen and a copper-amine catalyst. The high molecular weight products are engineering thermoplastics, and the low molecular weight products are oxidation stabilizers and melt viscosity improvers for thermoplastics.

BACKGROUND OF THE INVENTION

(1) Field of the invention

This invention relates to the formation of synthetic polymers from monovalent phenolic precursors and to compositions containing the same. The process of the invention is based on the catalytic demethylation of a phenolic monomer in the presence of a copper-amine catalyst.

(2) Description of the prior art

Polyphenylene ethers have been prepared in the past. In particular, U.S. Pat. No. 3,220,979 to McNelis discloses the preparation of a polymer of mesitol by an oxidative demethylation procedure which employs "activated" manganese oxide. U.S. Pats. Nos. 3,306,874 and 3,306,875 of Allan S. Hay and U.S. application Ser. No. 849,508, filed Aug. 12, 1969, also describe processes for the preparation of polyphenylene ethers and are hereby incorporated by reference.

The process of the above-mentioned McNelis patent (U.S. Pat. No. 3,220,979) is based on the oxidative demethylation of mesitol by means of "activated" manganese oxide. The invention disclosed herein differs from that of McNelis by the fact that the present process is an economical catalytic method which employs air or oxygen as the oxidizing agent, while the manganese oxide in the McNelis disclosures must be used in large quantities, at least equivalent to 0.5 time the moles of phenol and preferably from 3 to 10 times the moles of phenol.

The Hay patents (U.S. Pats. No. 3,306,874 and 3,306,875) are concerned with the polymerization pF phenolic monomers which have a hydrogen or halogen substituent in the para position. Monomers of the type employed in the practice of this invention are not disclosed to be polymerizable by the processes of either of the above-mentioned Hay patents. Moreover, it is unexpected that they can be successfully employed herein because the 4-methyl group is completely eliminated under the reaction conditions, except in the terminal position, while the 2- and 6-methyl groups are not affected at all.

STATEMENT OF THE INVENTION

According to the present invention, there is provided a process for the preparation of 2,6-disubstituted-1,4-phenylene ethers which comprises reacting the corresponding 2,6-disubstituted-4-(lower) alkyl phenol with oxygen in the presence of a complex catalyst comprising a copper salt and a primary, secondary or non-heterocyclic tertiary amine until formation of the 2,6-disubstituted-phenylene ether product is substantially complete, and recovering said product.

In a preferred feature, the polyphenylene ether product will contain repeating units of the general formula:

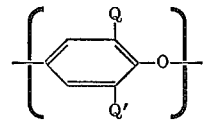

wherein Q and Q' are hydrocarbon groups of from 1 to 8 carbon atoms, including aliphatic, cycloaliphatic and aromatic groups.

In preferred embodiments, the present invention is concerned with the preparation of the following compounds and with novel compositions containing the same:

Structure I

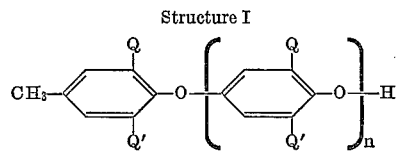

Structure I wherein Q and Q' are monovalent substituents selected from the group consisting of lower aliphatic radicals having from 1–4 carbon atoms and phenyl; $n$ is an integer of from 1 to about 300.

The process comprises forming a polymerization catalyst from a copper halide and an amine selected from the group consisting of primary, secondary and non-heterocyclic tertiary amines. Suitable monomers include compounds of the formula:

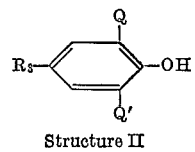

Structure II wherein Q and Q' are the same as defined hereinabove and R is (lower) alkyl, preferably methyl. The monomer is polymerized in the copper-amine catalyst in the presence of an organic solvent.

In the practice of the invention, oxygen or an oxygen containing gas (e.g. air) is passed into a solution containing the catalyst and the particular monomer. The process may be varied to produce either low oligomers (dimers, trimers, etc.) such as the dimer which is shown in Equation I:

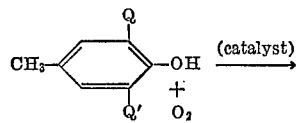

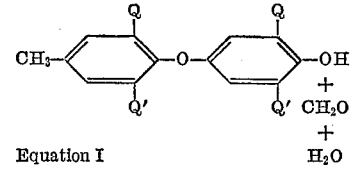

Equation I

The invention also contemplates the production of methanol insoluble high polymers according to Equation II:

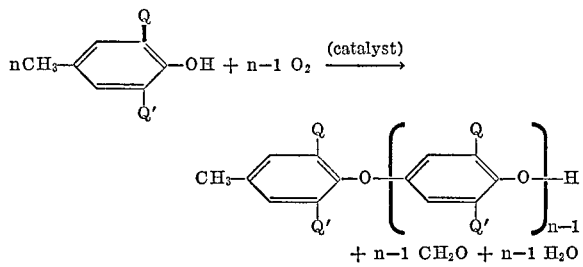

wherein $n$ is an integer of from about 2 to about 301.

Equation II

Catalysts which have been found to be useful for this process include copper salts, e.g., cuprous and cupric halides, in combination with amines, e.g., di-n-butyl amine. The rate of reaction may be accelerated by the addition of promoters, especially diphenyl guanidine. In general, the catalysts which may be employed are those which are useful for the production of polyphenylene ethers from 2,6-xylenol as described in the aforementioned Hay patents except that heterocyclic tertiary amines such as pyridine, lutidine and the like, do not cause the desired reaction to take place with the specific 4-(lower) alkyl substituted monomers used herein.

The particular solvent is not critical, and any suitable inert organic solvent may be employed. Solvents which are useful include aromatic compounds such as benzene, toluene chlorobenzene, etc., or chlorinated hydrocarbons such as tetrachloroethylene, methylene chloride, etc.

The amine concentration may vary within wide limitations, but is desirably added in low concentrations. A preferred range is from about 2.0 to 25.0 moles per 100 moles of monomer. Lower, straight chained dialkylmonoamines such as dibutylamine and diethylamine are preferred.

Typical examples of copper salts suitable for the process include cuprous chloride, cuprous bromide, cuprous sulfate, cuprous azide, cuprous tetramine sulfate, cupric chloride and cupric bromide.

The copper salt is desirably maintained at a low concentration preferably within the range of 0.2 to 2.5 moles per 100 moles of phenolic monomer. The reaction may be terminated when desired by methods well known to those skilled in the art.

Typically the molecular weight of the polymers produced by catalytic dealkylation of the phenolic monomer will be in the range of 2000 to 3000. The molecular weight may be increased to some extent by re-oxidation of the polymer, either with the same catalysts used for its preparation or by passing oxygen through a stirred mixture of polymer solution and aqueous base.

The compounds of the invention, in which $n$ is equal to an integer of from 1 to about 14 may be employed as oxidation stabilizers in normally oxygen-degradable hydrocarbon polymers, such as natural and synthetic rubber and other polymers such as polyolefins, e.g., polyethylene, polypropylene, poly(1-butene) and the like.

Other oxidatively unstable hydrocarbon polymers such as diene rubbers, e.g., polybutadiene, polystyrene, polyisobutylene, mixtures thereof and the like may also be stabilized with the products produced by the process of the invention. The lower molecular weight methanol-insoluble polymers are also useful for this purpose. In addition, low molecular weight polymer derived from mesitol may be used to replace part of the high molecular weight polyphenylene ethers such as those derived from 2,6-disubstituted-4-halo or 4H-phenols, in compositions which may also include polystyrene resins. These high molecular weight polyphenylene ethers may be represented by the following formula:

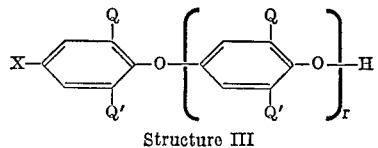

Structure III wherein Q and Q' are the same as hereinabove defined and X is a halogen, hydrogen or methyl; $r$ is an integer of at least 50. Also, the higher molecular weight polymers wherein X is lower alkyl may be used in preparing polymer compositions.

Molding compositions may be prepared which contain from about 99 to about 60 parts by weight of a compound of Structure III and about 1 to about 40 parts by weight of a low molecular weight compound of Structure I wherein $n$ is equal to an integer of from 1 to 50.

Molding compositions may also be prepared from (a) about 25 to 75 parts by weight of a compound of Structure III in combination with 75 to 25 parts by weight of a styrene resin and (b) from about 1 to about 40 parts by weight of a low molecular weight compound of Structure I wherein $n$ is from 1 to about 50, with the provision that the difference of $r$ and $n$ is at least 25.

The styrene resin is one having at least 25 percent by weight, polymer units derived from the compound having the formula:

(II)  $RC=CH_2$

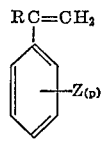

where R is hydrogen, lower alkyl or halogen; Z is a member selected from the class consisting of vinyl, hydrogen, chlorine and lower alkyl; and $p$ is a whole number equal to from 0 to 5. The term "styrene resin" as used throughout this disclosure and in the claims, and defined by the above Formula II includes by way of example, homopolymers such as polystyrene and polychlorostyrene, the modified polystyrenes such as rubber modified polystyrenes, and the styrene containing copolymers such as the styrene-acrylonitrile copolymers (SAN), styrene-butadiene copolymers, styrene-acrylonitrile-α-alkyl styrene copolymers, styrene-acrylonitrile-butadiene copolymers (ABS), poly-α-methylstyrene, copolymers of ethylvinylbenzene and divinylbenzene, and the like. The preferred styrene resins are the high impact polystyrenes, the ABS copolymers and the SAN copolymers.

Such compositions have better flow properties as shown by a decrease in melt viscosity in comparison with compositions including only the high molecular weight polyphenylene ethers. At the same time, in contrast with the behavior of conventional melt flow improvers, e.g., plasticizers, the strength, stiffness, heat distortion resistance, impact resistance and other important properties in articles molded from such compositions will not be substantially impaired.

Those skilled in the art will appreciate that the above-described compositions may also contain suitable antistatic agents, flame retardants, antidripping agents, pigments, plasticizers, fillers and reinforcing materials in conventional amounts.

The polymers of Structure I which are of higher molecular weight, e.g., $n$ is greater than 50, and preferably greater than 100, may be employed on the preparation of thermoplastic molded articles which are prepared by conventional extrusion and molding techniques.

The following examples are illustrations of particular embodiments of the invention and are not means to limit the scope thereof.

EXAMPLE I

A solution of 1.62 g. of cuprous bromide and 10.9 g. of di-n-butyl amine in 50 ml. of toluene is added to 500 ml. of toluene in a 1000 ml. stirred reactor equipped with a jacket and internal coils through which water is circulated from a constant temperature bath. 78 g. of mesitol is added and oxygen is introduced to the stirred mixture, which is maintained at 30° C., at a rate of one cubic foot per hour. After five hours, 90 ml. of 50% aqueous acetic acid is added and the upper layer is separated. Gas chromatographic analysis shows a series of peaks corresponding exactly in retention time to the series of oligomers of Structure I with $n$ varying from 0–5 (a mixture of these oligomers is independently prepared for comparison by the re-distribution of mesitol with poly(2,6-dimethyl-1,4-phenylene)ether. The mixture is washed repeatedly with 100 ml. portions of aqueous 10% sodium hydroxide solution to remove some of the unreacted mesitol and then with water. The solution is then dried over sodium sulfate and stripped under vacuum at room temperature to approximately half the original volume. The solution is refluxed overnight with a mixture of 100 g. of trimethylchlorosilane, 100 g. hexamethyldisilazane and 150 ml. of pyridine in order to convert the phenolic hydroxy groups in the mixture to the corresponding trimethylsilyl ethers. The reaction mixture is again concentrated under vacuum, filtered to remove amine hydrochlorides, and distilled under vacuum. A fraction of 11.1 g. boiling at 78° C. under a pressure of 1.5 mm. crystallizes on standing (M.P. 70–73° C.) and is identified as essentially pure trimethylsilyl ether of 2,6-dimethyl-4-(2,4,6-trimethylphenoxy) phenol, by gas chromatography and by comparison of the melting point with that of an authentic sample of this compound. The trimethylsilyl ether is converted to the phenol by dissolving it in methanol, adding one drop of concentrated aqueous hydrochloric acid and allowing the solution to stand for two hours at room temperature. Evaporation of the methanol yields, 2,6-dimethyl-4-(2,4,6-trimethylphenoxy) phenol, melting point 125–127° C. The melting point retention time on gas chromatography, and nuclear magnetic resonance spectrum of this material are identical with those of an authentic sample of this compound prepared by another method. A fraction of 1.2 g. boiling at 100° C. at a pressure of 1.4 mm. is shown to be pure trimer (Structure I, $n=2$) in the form of trimethylsilyl ether. In other fractions of the distillation "tetramer" and "pentamer" predominated but are not obtained in pure form.

EXAMPLE II

In a large open tube stirred by means of a Vibramix stirrer and immersed in a constant temperature bath at 25° C. is placed 100 ml. of toluene followed by 1.68 ml. of di-n-butyl amine and then by 0.223 g. of anhydrous cupric bromide. A solution of 11.2 g. of mesitol in 40 ml. of toluene is added and oxygen is introduced into the stirred mixture at a rate of 0.35 cubic feet per hour. After five hours, 5 ml. of 50% aqueous acetic acid is added. The upper phase is decanted and refluxed overnight with 10 ml. of trimethylchlorosilane, 10 ml. of hexamethyldisilazane, and 15 ml. of pyridine. Gas chromatographic analysis of the product shows that in addition to unreacted monomer all of the oligomers of Structure I at least up to $n=5$ are present.

EXAMPLE III

The procedure of Example II is followed, varying the type and concentration of the catalyst. In each case, the reaction is terminated after five hours and the composition determined by gas chromatography after conversion of the phenols to trimethylsilyl ethers. The ratio of products obtained, taking the mesitol concentration as unity in each case, is shown in Table I.

TABLE I

| Catalyst (a) | Catalyst ratio, Xy:Cu:amine:DPG | Product composition | | | |
|---|---|---|---|---|---|
| | | Mono | Di | Tri | Tetra |
| CuBr-DBA | 82:1:10 | 1.0 | .16 | .03 | |
| CuBr$_2$-DBA | 82:1:10 | 1.0 | .21 | .05 | |
| CuCl$_2$-NaBr-DBA | 82:1:2:10 | 1.0 | .16 | .03 | |
| CuBr-DBA-DPG | 82:1:10:1 | 1.0 | .53 | .30 | .14 |
| CuBr-DBA-DPG | 82:2:10:1 | 1.0 | .60 | .37 | .12 |
| CuBr-DBA-DPG | 82:4:10:1 | 1.0 | .44 | .24 | .05 |
| CuCl-DBA-DBG | 82:1:10:1 | 1.0 | .29 | .09 | |
| CuCl-DBA-DPG | 82:2:10:1 | 1.0 | .40 | .17 | .06 | a DBA–Di-n-butyl amine; DPG–diphenyl guanidine.
b Molar ratio–NaBr:CuCl$_2$-2:1.

EXAMPLE IV

This is carried out in the same way as Example II using 11.2 g. of mesitol, 14.0 ml. of toluene, and a catalyst composed of 0.40 g. of cuprous chloride, 0.41 g. of sodium bromide, 0.21 g. of diphenyl guanidine, and 3.36 ml. of dibutyl amine (molar ratio of xylenol: CuCl: NaBr: dibutylamine: diphenyl guanidine=82:4:4:20:1). Oxygen is introduced initially at a rate of 0.35 cu. ft./hr. Toluene is added from time to time to replace the solvent lost by evaporation and maintain the level in the reactor constant. After 24 hours the reaction is killed with 20 ml. of 50% aqueous acetic acid. The toluene phase is decanted, dried over sodium sulfate, and reduced in volume to 100 ml. Methanol is added rapidly to the stirred solution, and the precipitated polymer is removed by filtration and dried under vacuum at 40° C. The polymer weighs 5.0 g., has an infrared and nuclear magnetic resonance spectrum identical with that of authentic poly(2,6-dimethyl-1,4-phenylene) oxide and has a number average molecular weight of 2900 (weight average 9000). A second fraction of 1.75 g. of polymer is obtained on concentrating the filtrate to approximately 25 ml. after again adding methanol.

EXAMPLE V

A mixture of 112 g. of mesitol, 1.98 g. of cuprous chloride, 2.06 g. of sodium bromide, 33.6 ml. of di-n-butyl amine, 2.11 g. of diphenyl guanidine, and 1400 ml. of toluene is placed in a stirred three liter resin kettle maintained at 60° C. by circulating water through an internal coil from a constant temperature bath. Oxygen is introduced at a rate of four cubic feet per hour. After four and half hours, the reaction is terminated by addition of 75 ml. of 50% aqueous acetic acid and the upper layer is dried over sodium sulfate, reduced in volume to 900 ml., and the polymer precipitated by addition of methanol. The yield of polymer, after drying overnight under vacuum at 40° C., is 76.4 g. The polymer has an infrared spectrum identical with that of PPO prepared from 2,6-xylenol. The number average molecular weight is 1480; weight average is 4910.

EXAMPLE VI

A mixture of 275 g. of a high impact rubber modified polystyrene (Monsanto HT–91), 180 g. of polyphenylene ether prepared from 2,6-xylenol (IV=0.46 dl./g.), 45 g. of the polymer prepared in Example V, and small amounts of processing aids and stabilizers, is blended in a Waring Blender and extruded in a ¾" Wayne extruder (front 580° F., rear 540° F., die 540° F.). The melt viscosity of the extruded pellets; measured at a temperature of 540° F. and a shear of 1500 sec.$^{-1}$ is 1750 poises; a similar blend in which the low molecular weight mesitol polymer is replaced by an additional 45 g. of poly(2,6-dimethyl-1,4-phenylene)ether (IV=0.46 dl./g.) has a melt viscosity of 2350 poises. The extruded pellets containing the poly (2,6-dimethyl-1,4-phenylene)ether prepared from mesitol are molded into standard test bars on a 3 ounce Newbury injection molding machine. The test pieces are glossy and of a light olive color. They have a heat distortion temperature of 239° F., a notched Izod impact strength of 1.4 ft. lbs./i.o.n. a tensile yield strength of 9200 p.s.i., and an elongation of 25%.

EXAMPLE VII

The example illustrates the use of low molecular weight poly(2,6 - dimethyl-1,4-phenylene)ether as an oxidation stabilizer in polypropylene. Polypropylene (Profax #6501, unstabilized) is blended with small amounts of low molecular weight poly(2,6 - dimethyl - 1,4 - phenylene)ether (IV=0.17 dl./g) alone or in combination with dilauryl thiodipropionate, in a Brabender Plasticorder for 9 minutes at 175° C. Two gram samples of the resulting blends are molded at 450° F. into 10 mil films. Strips of these films one-half inch wide are suspended in a circulating air oven at 150° C. and the time measured until the first visible indication of decomposition of the film. The results are shown in Table II.

TABLE II

Time to decomposition of polypropylene films—(Profax #6501)

| Polyphenylene ether (0.17 dl./g.) (percent) | Dilauryl thiodipropionate (percent) | Time to decomposition, hrs. at 150° C. |
|---|---|---|
| None | None | 3 |
| Do | 0.25 | 4 |
| 1.0 | None | 3 |
| 0.25 | 0.25 | 7 |
| 1.0 | 0.25 | 23 |

Other particularly useful styrene resins which may be employed in the practice of the invention are disclosed in U.S. Pat. No. 3,383,435 to E. P. Cizek which is hereby incorporated by reference.

Other useful starting materials will be 4-position (lower) alkyl analogs of the 4-methyl-2,6-disubstituted phenol corresponding to Structure II. Illustratively, these will include 2,6-dimethyl-4-ethylphenol; 2,6 - dimethyl-4-n-hexylphenol; 2,6-diphenyl-4-ethylphenol and the like.

As used herein and the appended claims, the term (lower) alkyl is used to include straight and branched chain hydrocarbon groups such as methyl, ethyl, propyl, i-propyl, n-butyl and the like, containing up to about 8 carbon atoms.

Obviously, other modifications and variations of the present invention are possible in light of the above teachings. It is therefore to be understood that changes may be in the particular embodiments of the invention described which are within the full intended scope of the invention as defined by the appended claims.

What is claimed is:

1. A process for the preparation of a 2,6-disubstituted-1,4-phenylene ether of the formula:

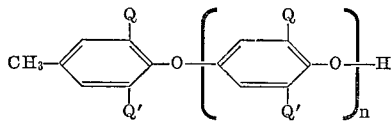

wherein Q and Q' are monovalent substituents selected from the group consisting of lower aliphatic radicals having from 1 to 4 carbon atoms and phenyl, and $n$ is a whole integer of from 1 to about 300; which comprises reacting the corresponding 2,6-disubstituted - 4 - (lower) alkyl phenol with oxygen in the presence of a complex catalyst comprising a copper salt and a primary, secondary or non-heterocyclic tertiary amine until formation of a 2,6-disubstituted-phenylene ether product is substantially complete, and recovering said product.

2. The process of claim 1 wherein said 2,6-dialkyl-1,4-phenylene ether product contains repeating units of the general formula:

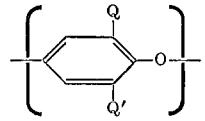

wherein Q and Q' are hydrocarbon groups of from 1 to about 8 carbon atoms.

3. A process for the preparation of a 2,6-disubstituted-1,4-phenylene ether of the formula:

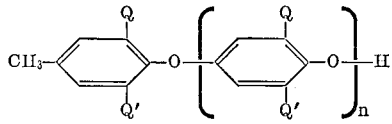

wherein Q and Q' are monovalent substituents selected from the group consisting of lower aliphatic radicals having from 1 to 4 carbon atoms and phenyl, and $n$ is a whole integer of from 1 to about 300; said process comprising
    (a) forming a polymerization complex catalyst from a copper halide and an amine selected from the group consisting of primary, secondary and non-heterocyclic tertiary amines, and
    (b) oxidatively coupling a monovalent phenol of the formula:

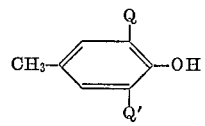

wherein Q and Q' are as defined above, in the presence of an organic solvent and the catalyst of step (a).

4. The process of claim 3 wherein the monovalent phenol corresponds to the formula:

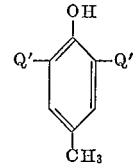

wherein Q and Q' are each alkyl having from 1 to 4 carbon atoms.

5. The process of claim 3 wherein the copper salt is selected from the group consisting of cuprous and cupric halides.

6. The process of claim 3 wherein the monovalent phenol is 2,4,6-trimethylphenol.

7. The process of claim 3 wherein the catalyst is a complex of di-n-butyl amine and cuprous chloride.

References Cited
UNITED STATES PATENTS 3,220,979  11/1965  McNelis.

MELVIN GOLDSTEIN, Primary Examiner

U.S. Cl. X.R.

260—45.95, 613 R, 874